United States Patent

[11] 3,569,749

| [72] | Inventor | Rudolf Zeiringer<br>Graz, Austria |
|---|---|---|
| [21] | Appl. No. | 873,319 |
| [22] | Filed | Nov. 3, 1969 |
| [45] | Patented | Mar. 9, 1971 |
| [73] | Assignee | Hans List<br>Graz, Austria |
| [32] | Priority | Nov. 6, 1968 |
| [33] | | Austria |
| [31] | | A10806/68 |

[54] PIEZOELECTRIC ACCELEROMETER WITH AN INTERNAL SPHERICAL BEARING
6 Claims, 1 Drawing Fig.

[52] U.S. Cl. .................................................. 310/8.4,
 73/497, 310/8.7, 310/9.0, 310/9.1
[51] Int. Cl. ...................................................... H04r 17/00
[50] Field of Search .......................................... 310/8—8.7,
 8.9—9.4; 340/17; 73/71, 497, 500

[56] References Cited
UNITED STATES PATENTS

| 3,206,626 | 9/1965 | Burley............................ | 310/8.4 |
| 3,229,128 | 1/1966 | Faulk et al...................... | 310/8.4 |
| 3,351,787 | 11/1967 | Kistler........................... | 310/8.4 |
| 3,482,121 | 12/1969 | Hatschek....................... | 310/8.4 |

*Primary Examiner*—Milton O. Hirshfield
*Assistant Examiner*—Mark O. Budd
*Attorney*—Watson, Cole, Grindle & Watson ABSTRACT: A piezoelectric accelerometer having a measuring element consisting of superimposed discs of piezoelectric material and a convex pressure-transmitting spacer located between a seismic mass and a concave seat on a housing, a prestressing element abuts the seismic mass at one end, and is secured to the housing at its other end.

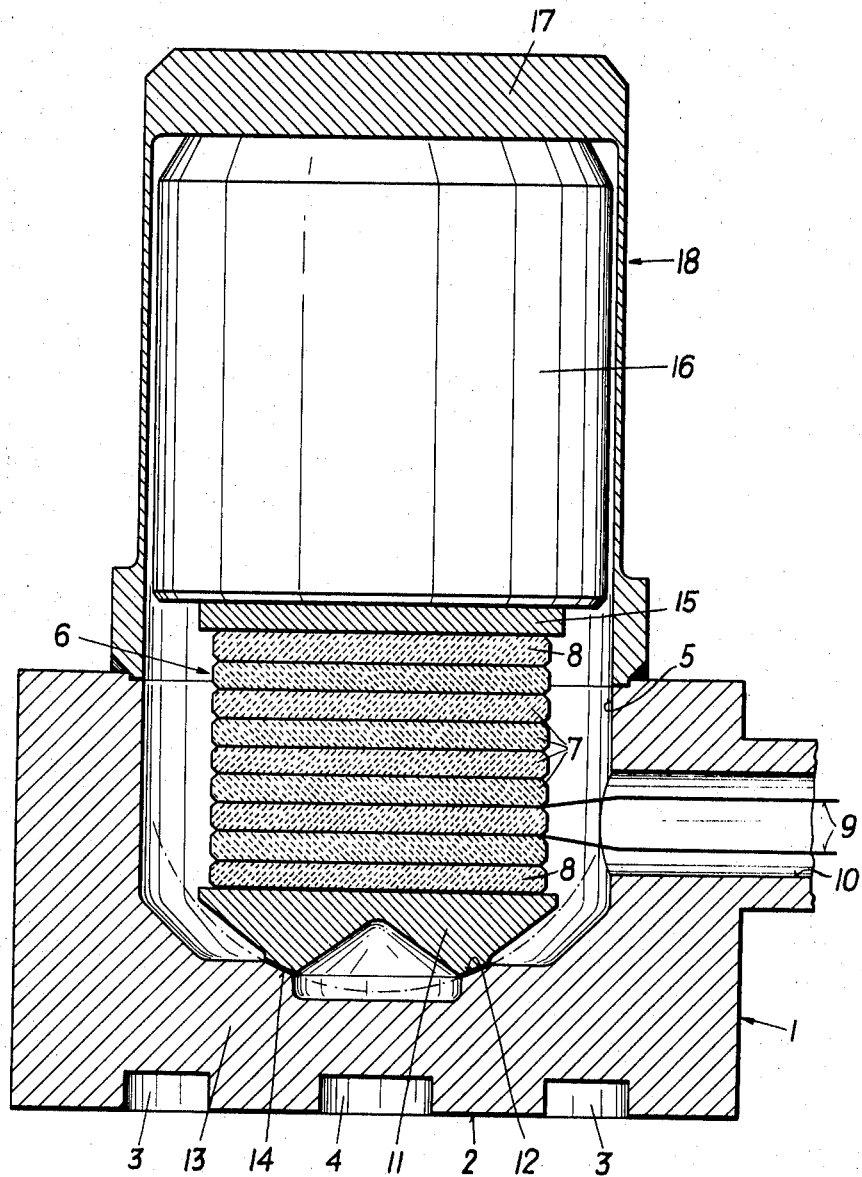

PIEZOELECTRIC ACCELEROMETER WITH AN INTERNAL SPHERICAL BEARING

The invention relates to a piezoelectric accelerometer comprising an axially prestressed piezoelectric-measuring element located between the seismic mass and a support provided in the transducer housing, and consisting of a plurality of discs.

In a number of applications, such as in connection with the motor monitoring of jet-propelled aircraft, similar measuring instruments are subject to considerable thermal stresses. On the bearing surfaces of the monitored engines to which the accelerometers are attached, temperatures up to 600°C are liable to occur occasionally, for example during thrust reversals or after the engine has been stopped, when in the absence of any cooling air current the heat flows outwardly from the extremely hot inner parts.

By means of already known expedients, such as the provision of cooling channels in the bearing surface of the instruments, it is possible to produce a temperature difference between the bearing surface and the measuring element, but the temperatures occurring in the measuring element are still prohibitive. It is true that in the case of accelerometers designed for monitoring purposes the well-known reduction of the piezoelectric effect of the quartz crystals generally used for the measuring element which usually accompanies rising temperatures will not unduly affect operations, as long as complete restoration of the piezoelectric effect after the cooling of the instrument is assured. Besides, measurements are generally not taken at extremely high temperatures. Moreover, the monitoring equipment may be set to a relatively high average of the operational temperature.

However, in order to ensure interchangeability of accelerometers, it is necessary for them to be in absolute conformity among themselves with regard to their sensitivity. Any permanent alteration of sensitivity in operation is definitely inadmissible. However, although it be quite possible in theory to heat measuring elements consisting of quartz crystals up to a temperature of 573°C (Curie point) without their sensitivity suffering a permanent loss, in actual practice, however, the maximum temperature which such a transducer is capable of resisting is substantially lower, even if the insulating material used in the process would withstand such high temperatures. Generally, a permanent loss of sensitivity is to be expected already when the temperature in the vicinity of the measuring element attains 300 °C.

It is therefore, the object of the present invention to effectively avoid these shortcomings of conventional equipment and to provide an accelerometer featuring a considerable heat-resisting quality. For that purpose, according to the invention, the support presents a concave spherical-bearing surface carrying a pressure-transmitting spacer having a convex spherical centersurface and located between the measuring element and the support, the basic idea of this design being the realization that uneven compressive loads affecting individual discs of the measuring element are chiefly responsible for the inadequate heat-resisting quality of such a transducer. In view of the considerable solidity and rigidity of the quartz material it is quite possible for certain areas of the quartz discs to be subjected to a surface pressure attaining several times the amount of the average prestress, which in conjunction with high temperatures will locally overstrain the crystalline quartz structure and consequently, produce cracks. Similar unilateral compressive loads are liable to arise already during the assembly of the transducer as a result of an unequal prestress of the tube spring containing the measuring equipment. Likewise, during the operation of the measuring instrument, the quartz discs are occasionally subject to irregular compressive loads due to uneven heating of the housing and tube spring, such as for example where the measuring instrument is air-cooled on the one side only.

In the transducer according to the invention, however, the prestress is evenly distributed since as a result of its unilateral gimbal bearing arrangement the measuring element will automatically set itself to the direction wherein is axis coincides with the positive direction of the initial stressing force. This balancing action takes place not only during the assembly of the transducer but also in operation, whenever the transducer is subject to unbalanced loads.

The heat-resisting quality is further improved according to the invention by the annular design of the bearing surface of the support and of the countersurface of the pressure-transmitting spacer. As a result, only a very small cross-sectional area is available for the transfer of heat from the transducer housing to the pressure-transmitting spacer and consequently, to the measuring element, so that the measuring element is slowly and evenly heated and objectionably high temperature gradients are avoided. This measure too, prevents the formation of cracks in the quartz discs.

In connection with the last-mentioned design it is advisable according to the invention, to provide a pressure-transmitting spacer presenting a cross section which progressively diminishes in size in the direction of the annular countersurface. This facilitates even heating of the pressure-transmitting spacer and consequently, of the adjacent discs of the measuring element.

According to another feature of the invention the pressure-transmitting spacer is made of a material having a substantially lesser coefficient of thermal expansion than the material of the transducer housing and of the transducer element producing the prestress, such as for example, a tube spring. It is the purpose of this arrangement to reduce the prestress of the measuring element at extremely high thermal stresses, thereby protecting the measuring element against possible damage and consequently precluding any loss of sensitivity at peak temperatures when generally, no measurements are taken anyway. As a matter of fact, experience goes to show that it is possible for a mechanically unloaded measuring quartz or set of measuring quartzes, when slowly and evenly heated, to be brought to a temperature close to the Curie point, without thereby causing any permanent loss of sensitivity. On the other hand, if in addition to a high thermal stress also a relatively great mechanical prestress is brought to bear upon the measuring element, overstraining of the quartz will lead to the partial destruction of the measuring quartzes already at substantially lower temperatures, microscopically small cracks in the quartz structure resulting in a permanent diminution of sensitivity.

Finally, it has been found to be particularly advisable according to a further feature of the invention, to insert at least at one end of the measuring element a disc made of a nonpiezoelectric material, such as a quartz heated above the Curie point. This precaution takes the fact into account that the bottommost and the topmost discs of the measuring element are particularly liable to suffer from an excessive thermal stress during the heating or cooling of the transducer as a result of an abnormally high temperature gradient. Thus the use of nonpiezoelectric terminal discs makes it possible to preserve the sensitivity of the transducer also in the presence of a high temperature gradient in the transition zone between the measuring element and the adjacent metallic transducer elements. The use of superheated quartz as a material for the nonpiezoelectric discs has proved particularly advantageous because this type of heat treatment is easy to perform and because the remaining physical properties of the quartz material are maintained in conformity with the remaining discs of the measuring element.

Further details of the invention will appear from the following description of an embodiment of the invention with reference to the accompanying drawing showing a highly heat resistant piezoelectric accelerometer.

The housing 1 of the transducer is provided with cooling channels 3 and 4 on its bearing surface 2 for the purpose of reducing the transfer of heat from the measuring point to the housing. Located in the central receiving bore 5 is the measuring element 6 of the transducer consisting of superimposed discs 7 of a piezoelectric material such as quartz and two terminal discs 8 of a piezoelectrically neutral material, such as quartz heated to a temperature above the Curie point. The electrodes required for the charge dissipation from the discs 7 are not shown in the drawing, nor are the connecting wires for same. The connecting wires 9 of the measuring element 6 extend through a lateral bore 10 of the housing 1 leading to a connecting socket (not shown).

The measuring element 6 rests upon a pressure-transmitting spacer 11 supported by an annular bearing surface 12 of the housing bottom 13 forming the seat of the measuring arrangement.

The bearing surface 12 is part of a concave spherical surface in concentric relation to the receiving bore 5. The cross-sectional area of the pressure-transmitting spacer 11 diminishes in the direction of the housing bottom 13, so that the pressure-transmitting spacer 11 rests only with an annular countersurface 14 upon the bearing surface 12.

The measuring element 6 is topped by the seismic mass 16 with the interposition of a metal shim 15, the said seismic mass resting at the bottom 17 of a tube spring 18 surrounding same and welded with its reinforced circular rim 19 to the top of the transducer housing 1.

The tube spring 18 welded to the transducer housing with the simultaneous application of an axial load keeps the measuring element under a predetermined axial prestress.

During the welding of the tube spring 18 to the housing 1 minor faults in the assembly are likely to occur which in transducers of conventional design are liable to cause an uneven distribution of the prestress over the surfaces of individual quartz discs and consequently, produce a mechanical overstress of same. In the transducer shown in the drawing this risk has been eliminated because the pressure-transmitting spacer 11, being supported by the spherical-bearing surface 12 of the housing 1, will automatically set itself to the direction in which the axis of the measuring element coincides with the positive direction of the initial stressing force produced by the tube spring 18. In addition, the fact that the pressure-transmitting spacer 11 rests only upon a narrow annular surface and the particular shape of the said spacer provide particular conditions for the transfer of heat from the housing 1 to the measuring element 6. On the one hand, the annular bearing surface 12 provides only a very small heat-conducting cross-sectional area and on the other hand, the fact that the cross section of the heat-transmitting spacer 11 increases progressively towards the measuring element assures a highly uniform distribution of the heat flowing from the housing to the measuring element, so that objectionably high temperature differences are not allowed to develop in the area of the measuring element 6.

The pressure-transmitting spacer 11 is furthermore, made of a material having a substantially lower coefficient of thermal expansion than the material of the housing 1 or of the tube spring 18. Therefore, in the event of peak temperatures the prestress of the measuring element 6 diminishes which is by no means objectionable from the viewpoint of general measuring technique, since no measurements are taken at such extremely high temperatures. On the other hand, the diminution of the prestress precludes the simultaneous development of thermal and mechanical peak loads in the quartz discs liable to produce a permanent loss of sensitivity.

The provision of two thermal discs 8 made of a nonpiezoelectric material constitutes an additional precaution for the protection of the piezoelectric discs 70. In fact, extreme temperature differences are chiefly to be expected in such places of the transducer where the measuring element 6 adjoins metallic transducer members, in the present instance the pressure-transmitting plate 11 and the shim 15. The nonpiezoelectric discs 8 are quite capable of withstanding these high thermal stresses without suffering any alteration whatever.

I claim:

1. A piezoelectric accelerometer comprising a measuring element consisting of superimposed discs of a piezoelectric material, a seismic mass adjoining one end of the said measuring element, a pressure-transmitting spacer adjoining the other end of the said measuring element, a convex spherical surface on the side of the said pressure-transmitting spacer facing away from the measuring element, a transducer housing, a support in the said transducer housing defined by a concave spherical bearing surface, the said pressure-transmitting spacer adjoining the said concave spherical-bearing surface of the transducer housing with the said convex spherical surface, a prestressing element connected at one end thereof with the said transducer housing, the other end of said prestressing element adjoining the outer front surface of the said seismic mass facing away from the measuring element.

2. A piezoelectric accelerometer according to claim 1, wherein the said prestressing element is a tube spring surrounding the said seismic mass, the annular inner end of the said tube spring being attached to the said transducer housing, the bottom of the tube spring at the outer end of the tube spring adjoining the outer front surface of the said seismic mass.

3. A piezoelectric accelerometer according to claim 1, wherein the said bearing surface of the support and the said convex spherical surface of the pressure-transmitting spacer are of annular design.

4. A piezoelectric accelerometer according to claim 3, wherein the said pressure-transmitting spacer presents a cross section diminishing progressively in the direction of the said annular convex spherical surface.

5. A piezoelectric accelerometer according to claim 1, wherein the said pressure-transmitting spacer is made of a material having a substantially lesser coefficient of thermal expansion than the material of the said transducer housing and of the said prestressing element.

6. A piezoelectric accelerometer according to claim 1, comprising at least one disc of a nonpiezoelectric material, such as quartz heated to a temperature above the Curie point, the said disc being applied to one end of said measuring element.